Aug. 6, 1935.   D. HELFER   2,010,301
DEVICE FOR EXAMINING THE DIAMETER OF BORES
Filed Jan. 19, 1933
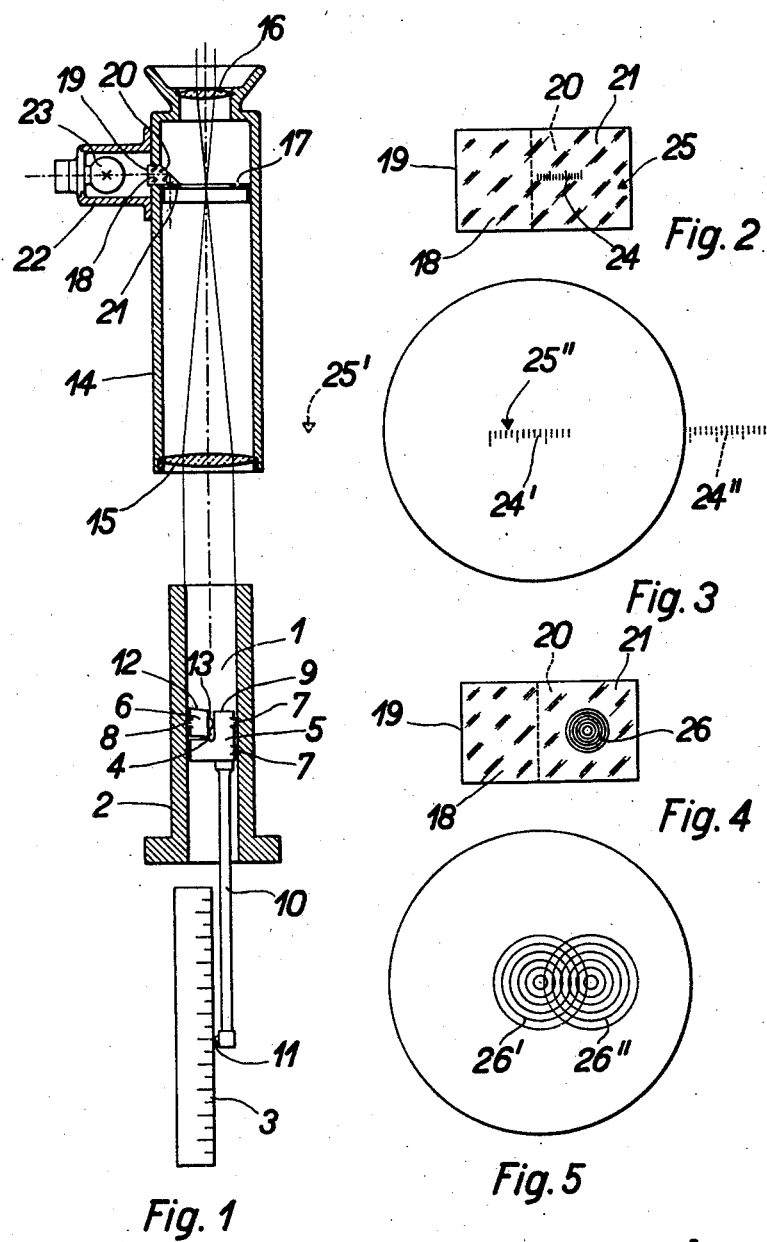
Inventor:
Daniel Helfer Patented Aug. 6, 1935

2,010,301

UNITED STATES PATENT OFFICE 2,010,301

DEVICE FOR EXAMINING THE DIAMETER OF BORES

Daniel Helfer, Jena, Germany, assignor to firm Carl Zeiss, Jena, Germany

Application January 19, 1933, Serial No. 652,485
In Germany January 21, 1932

5 Claims. (Cl. 88—14)

I have filed an application in Germany, January 21, 1932.

It has been suggested to examine the straightness of narrow and comparatively long bores, for instance those of gun barrels, by means of an autocollimation method, in which, as is well known, use is made of a telescope and a plane reflector, the image plane of this telescope containing an illuminated mark. An examination of this kind, however, will not permit to discover irregularities in the diameter of the bores.

The object of the invention is a device for the determination of the said irregularities, which, so far, have been neglected. The new device comprises an autocollimation telescope and a reflector holder consisting of two parts which are elastic so as to be inclined relatively to each other, each of these parts having a plane reflector. When effecting an examination, the reflector holder is introduced into and pushed through the bore to be examined, each plane reflector producing in the image plane of the telescope an image of the telescope mark, and any variation in the reciprocal positions of the two images indicating alterations of the bore diameter. The examination may be effected, for instance, by first ascertaining the reciprocal distance of the two mark images by means of calipers adjusted to the normal bore diameter and then examining whether there appear any deviations from the said reciprocal distance when the reflectors are being pushed through the bore, any such deviation indicating that that part of the bore which guides the reflectors at the moment has not the correct diameter.

The mark of the autocollimation telescope is constructed according to the purpose for which it is to be used in each particular case. Frequently it may be convenient to use as a mark a scale and an index. Each of the plane reflectors images the two parts of the mark in the image plane of the telescope, and these two parts may be given such reciprocal positions that, owing to the reciprocal inclinations of the two reflectors, the image the one reflector produces of one part of the mark may be given a relation to the image the other reflector produces of the other part of the mark. In the case of the two reflectors having definite inclinations according to a normal bore diameter, it is easy to give the index such a position relatively to the scale in the telescope that the index image produced by the one of the reflectors lies at a special point, for instance at the point of origin or at the zero point of the scale image produced by the other reflector.

Using a telescope mark consisting of a scale and an index is not advisable when, in addition to the displacement in the bore, the reflectors are to effect a rotary movement, as will be required when measuring the exterior diameter of the grooves in a helical rifled gun barrel. In examinations of this kind, it is advisable to use as a telescope mark a group of concentric circles.

The accompanying drawing illustrates a constructional example of an instrument according to the invention. Figure 1 represents the instrument in a longitudinal section. Figure 2 shows in a view a single part of the example, and Figure 3 the image seen by an observer using the instrument. Figure 4 represents another constructional form of the single part according to Figure 2, and Figure 5 the image seen by an observer when making use of the single part according to Figure 4.

The example explaining the invention applies to the examination of the bore 1 of the cylinder 2 of a petrol pump for power-driven vehicles. The examination device consists of an autocollimation telescope, a reflector holder, and a scale. This scale is denominated 3. The reflector holder comprises two parts 5 and 6 elastically connected by means of a piece 4 and adapted to suit the diameter of the bore 1, the part 5 having a plurality of supporting feet 7, and the part 6 one support foot 8. The part 5 has a highly polished plane end surface 9, which is approximately at right angles to the straight line determined by the feet 7, and another end surface 5, to which is connected a guide rod 10 having at its other extremity an index 11. The part 6 has also a plane highly polished surface 12. This surface 12 and the surface 9 embrace an angle slightly inferior to 180°. The support foot 8 is opposite that of the feet 7 which is next to the polished surface 9. Between the parts 5 and 6 is disposed a spring 13 which presses them towards the wall of the bore 1. The autocollimation telescope has a tube 14 containing an objective 15 and an ocular 16, in the common focal plane of which is disposed a field-of-view diaphragm 17. An illumination prism 18 is so disposed in the tube 14 that its surface 19, which is struck by the light, is parallel to the optical telescope axis and lies outside this tube, a reflecting surface 20 as well as the light exit surface 21 of this prism 18 extending into the tube 14. The light exit surface 21 lies in the plane of the diaphragm 17, which is apertured accordingly. The prism 18 is covered by a lamp housing 22 fixed to the telescope tube 14 and containing a glow lamp 23. The light exit surface 21 of the prism 18 has a scale 24 and an index 25.

When effecting an examination, the cylinder 2 and the telescope are given in the known manner a position in which the optical telescope axis and the axis of the bore 1 coincide approximately. The scale 3 is placed into the elongation of this common axis, and the reflector carrier introduced into the bore 1. The wall of the bore presses the parts 5 and 6 slightly against the action of the spring 13, so that the angle which the reflecting surfaces 9 and 12 embrace when outside the bore is reduced accordingly. The lamp 23 is connected to a circuit and made to glow. The light emanating from the lamp 23 traverses the surface 19 of the prism 18 and is deflected by the surface 20 in the direction of the optical telescope axis so as to illuminate the parts 24 and 25 of the mark on the light exit surface 21. The surface 21 lying in the focal plane of the objective 15, this objective images the mark 24, 25 at an infinitely great distance. The imaging rays, which are parallel when leaving the objective 15, are reflected on the surfaces 9 and 12, the objective 15 projecting in the plane of the diaphragm 17 two images 24', 25' and 24", 25" of the parts 24, 25. The images 24' and 24" as well as the images 25' and 25" would coincide if the two surfaces 9 and 12 were parallel to each other. The smaller the angle embraced by these two surfaces, the more will the images appear to be displaced relatively to each other. The feet 7 and 8 are conveniently given such a height that a normal diameter of the bore 1 will cause the image 25" of the index 25 to point at a line in the middle of the scale image 24' (Figure 3). When the field-of-view diaphragm 17 is given a suitable size, the images 24" and 25' will lie outside the field of view and will therefore not be perceived by the observer looking into the ocular 16. If the rod 10 and the reflector holder are now displaced from the one end of the bore 1 to the other, there will appear deviations from the normal diameter, these deviations being due to displacements of the index image 25" relative to the index image 24' which may be measured direct when the scale 24 is divided accordingly. The described positions of the supporting feet 7 and 8 permit the observer to extend his examination also to the front end of the cylinder 2, in which case the reflecting surfaces 9 and 12 will protrude from the cylinder 2. The position of the part of the bore 1 which is being examined is indicated direct by the position of the index 11 relative to the division lines of the scale 3.

In the constructional form represented by Figure 4, a group of concentric circles 26 is provided on the light exit surface 21 of the prism 18. This constructional form may be used to advantage when the form of the bore 1 causes the reflector carriers 5 and 6 to effect rotations about the axis of the bore while the guide rod 10 is being longitudinally displaced. The polished surfaces 9 and 12 produce in the diaphragm plane two images 26' and 26" of the concentric circles of the mark 26. By suitably arranging the mark 26 in the telescope and inclining accordingly one of the reflecting surfaces 9 and 12 relatively to the optical telescope axis, one of these images may be given a position concentric to the optical axis, when this image will appear not to partake of the movements of the reflector carrier and this because it is rotating only about the centre of the circle. The other mark image will describe circles about the first said mark image, and the number of those rings of the said two images which cover each other provide a measure for the diameter of the bore 1.

I claim:

1. A device for examining the diameter of a bore, comprising a telescope aligned axially with the bore, the said telescope consisting at least of an objective and an ocular, a mark system disposed in the image plane of the telescope exterior to the field of view, means for illuminating the mark system, a holder inserted into the bore and consisting of two parts, one of these parts being mounted resiliently and pivotally on the said other part, and two plane reflectors each of which is supported by one of the said parts, the reflecting surfaces of these two reflectors being positioned in front of the said objective and including an angle of slightly less than 180°, the pivot axis of the said one part being parallel to the line of intersection of the two reflecting planes.

2. A device for examining the diameter of a bore, comprising a telescope aligned axially with the bore, the said telescope consisting at least of an objective and an ocular, a mark system disposed in the image plane of the telescope exterior to the field of view, means for illuminating the mark system, and a holder inserted into the bore and consisting of two parts, one of these parts being mounted resiliently and pivotally on the said other part, one surface of each of the said two parts representing a plane reflector, these two surfaces being positioned in front of the said objective and including an angle of slightly less than 180°, and the pivot axis of the said one part being parallel to the line of intersection of the two reflecting planes.

3. In a device according to claim 1, the mark system consisting of a scale and an index.

4. In a device according to claim 1, the mark system consisting of a group of concentric circles.

5. A device for examining the diameter of a bore, comprising a telescope, aligned axially with the bore, the said telescope consisting at least of an objective and an ocular, a mark system disposed in the image plane of the telescope exterior to the field of view, means for illuminating the mark system, a holder inserted into the bore and consisting of two parts, one of these parts being mounted resiliently and pivotally on the said other part, two plane reflectors each of which is supported by one of the said parts, the reflecting surfaces of these two reflectors being positioned in front of the said objective and including an angle of slightly less than 180°, the pivot axis of the said one part being parallel to the line of intersection of the two reflecting planes, an index connected to the said holder, and a scale, the index cooperating with this scale.

DANIEL HELFER.